INVENTOR.
FRANZ J. SCHRAMEL
BY Frank R. Trifari
AGENT

INVENTOR.
FRANZ J. SCHRAMEL
BY
Frank R. Jeifani
AGENT

INVENTOR.
FRANZ J. SCHRAMEL
BY
Frank R. Trifari
AGENT

United States Patent Office 3,333,051
Patented July 25, 1967

3,333,051

SYSTEM FOR THE TIME-MULTIPLEX TRANSMISSION OF TELEGRAPH SIGNALS

Franz Josef Schramel, Hilversum, Netherlands, assignor to North American Philips Company, Inc., New York, N. Y., a corporation of Delaware Filed July 17, 1963, Ser. No. 295,683
Claims priority, application Netherlands, July 18, 1962, 281,128
2 Claims. (Cl. 178—4)

This invention relates to a system for the time-multiplex transmission of telegrams. At present, telecomunication channels of comparatively high quality, for example, telephone lines, are frequently used for the transmission of telegrams or, generally, of binary coded information. In view of the operating costs of such a telecommunication channel it is important that the information transport capacity of the channel should be fully utilized. When a telephone line having a pass band of from 300 to 3000 c./s. is used as the telecommunication channel, a telegraph speed of 6000 bits/s. is obtainable in theory. The use of this extremely high telegraph speed, however, has the drawback that the mechanical equipment at the beginning and at the end of the line must be highly complicated and hence is expensive both with respect to purchase and to maintenance. In a known manner of overcoming this difficulty a number of telegrams are individually transmitted in time-multiplex at a comparatively low telegraph speed of, for example, 50 bits/s. It is an object of the present invention to provide an improvement of this system which further increases the efficiency of the telecommunication channel. According to the invention the time-multiplex system is combined with the space-multiplex system in a sense that a transmitting repeater including a reduction stage is provided at the transmitter end of the line, and a receiving repeater including a selecting stage is provided at the receiver end of the line. This results in further compression of a flow of information to be transmitted and hence in an increased efficiency of the line. The invention is characterized in that the transmitting repeater is connected, through a transmitter including a synchronizing signal generator, to a transmission channel and comprises the following members:

(1) $b$ receiving distributors which each comprise an input for the sequential reception of information, a set of $s$ outputs for supplying information in parallel and an additional output for delivering a bivalent signal which indicates whether or not the receiving distributors concerned have information ready for transmission;

(2) a transmitting memory comprising $a$ memory compartments, where $a<b$ and is equal to the maximum number of telegrams to be simultaneously transmitted in time-multiplex through the transmission channel, where each memory compartment corresponds to a control terminal the energization of which reults in that an item of information offered in parallel at the same instant to $s$ inputs of the transmitting memory is stored in the relevant memory compartment, the transmitting memory being designed so that all the information stored in it can be read in sequence;

(3) a counting circuit having a control terminal and $a$ outputs, each output being connected to a control terminal of the receiving memory;

(4) a single selector which connects the additional outputs of the receiving distributors to the control terminal of the counting circuit and also to the transmitter;

(5) an s-multiple selector which connects the sets each comprising $s$ outputs of the receiving repeaters to the $s$ inputs of the transmitting memory;

(6) a control circuit which in cyclic sequence activates the selectors so that they scan all the receiving distributors, the transmitter so that it transmits the synchronizing signal, and the transmitting memory so that it sequentially transmits all the information stored in it.

In order that the invention may be more readily understood, an embodiment thereof will now be described, by way of example, with reference to the accompanying drawings, in which.

Figure 1:
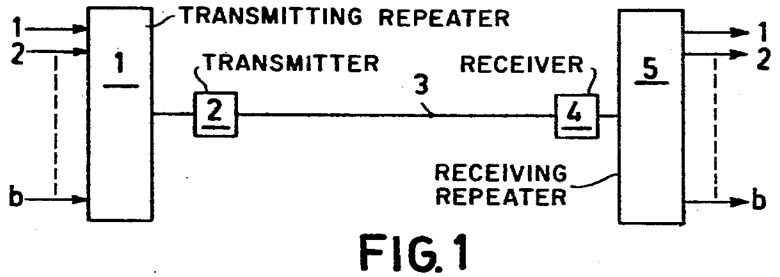
FIG. 1 is a block schematic diagram illustrating the idea underlying the invention.

Referring now to FIG. 1, reference numeral 1 denotes repeater, 2 a transmitter, 3 a telephone line, 4 a receiver and 5 a receiving repeater. The transmitting repeater 1 is connected through a number of wires, hereinafter referred to as incoming telegraph lines, to an equal number of devices which deliver telegraph signals. The speed at which these devices deliver information in their operative condition is much lower than the maximum permissible telegraph speed of the telephone line 3 and, for example, is 50 bits/s. Generally the said devices are arranged at a comparatively small distance from the transmitting repeater, for example, in the same building, however, the invention is independent of this detail. With respect to the transmitting repeater the incoming telegraph lines function as sources of information. The receiving repeater 5 is connected through a number of wires, hereinafter referred to as out-going telegraph lines, to an equal number of information processing devices. These devices, the nature of which is not of importance for the invention, can receive their input information at the same speed (in the present embodiment at a speed of 50 bits/s.) as that at which the devices which deliver the telegraph signals at the other end of the telephone line can deliver telegraph signals. These information processing devices generally are also arranged at a comparatively small distance from the receiving repeater 5, for example, in the same building, however, the invention is independent of this detail as well. With respect to the transmitting repeater the outgoing telegraph lines function as receivers of information.

Assume that $a$ telegrams can simultaneously (in actual fact semi-simultaneously) be transmitted in time-multiplex through the telephone line 3, while the corresponding amount of information can be delivered by $b$ sources of information with an acceptable probability of service interruption. In the most simple case the receiving repeater 5 is connected to $b$ information processing devices, and information delivered by a given source of information must always be transmitted to the same information receiver. Thus, in this event there is a 1:1-correspondence between information sources and information receivers. This assumption is not essential, however, and it may well be that the number of information receivers which are connected to the receiving repeater differs from the number of information sources connected to the transmitting repeater.

The transmitting repeater 1 includes a memory in which $p$ code groups of each of the telegrams delivered by the operative sources of information can be stored, where $p$ is comparatively small, for example, being equal to 1, 2 or 3. Furthermore, as any instant information can be made available in the transmitting repeater 1 about the information sources which deliver information and the sources which deliver no information and, owing to the above simplifying assumption that the information sources are associated with the information receivers with a 1:1-correspondence, also about the information receivers to which the telegrams delivered by the operative information sources are to be transmitted. This information can be recorded, in a form which may be redundant, in a code group which is referred to as the address code group. If there are $b$ information sources which are each associated in 1:1-correspondence with an information receiver, the number of which consequently is also $b$, and if the address is coded in a code containing no redundant information, the address code group has $b$ code element places which are each associated in 1:1-correspondence to a source of information and hence also to the corresponding receiver of information. The value 0 of a code element of the address code group may, for example, be given the meaning "the information source corresponding to the relevant code element place does not transmit information" and the value 1 of a code element may be given the meaning "the information source corresponding to the relevant code element place transmits information and this information is to be transmitted to the information receiver associated with this information source."

The transmitting repeater 1 transmits, by way of the transmitter 2 at the maximum telegraph speed of the telephone line 3, the following signals:

(1) A synchronizing signal;

(2) The address code group;

(3) The code element which are stored in the memory of the transmitting repeater corresponding to all of the information sources denoted by the address code group;

(4) A new synchronizing signal, after all the code elements of all the $p$ code groups of each of the telegrams have been transmitted, so that the cycle is repeated.

Since both in the memory of the transmitting repeater and in that of the receiving repeater a re-grouping of the code elements can take place without any complication, it is immaterial in what sequence the code elements of the various telegrams are transmitted. Thus, for example, all the code elements of the $p$ code groups of the first telegram to be passed on may be transmitted first, followed by all the code elements of the $p$ code groups of the second telegram to be passed on, and so on. Alternatively, with equal effect, all the first code elements of the $p$ code groups of the telegrams may be transmitted first, followed by all the second code elements thereof, and so on.

Since, however, at most $a$ telegrams can simultaneously be transmitted in time-multiplex, the devices delivering information must be mutually blocked in a manner such that at most $a$ of them can simultaneously be operative. For this purpose, however, countless arrangements are known, which are also capable of allotting priorities, which may be different, to the information sources.

Let it be assumed that per cycle of each transmitted telegram $p$ code groups are transmitted, that each code group has $n$ code element places, that the address code group has $m$ code element places, that at most $a$ telegrams can simultaneously be transmitted in time-multiplex, that the information sources, when operative, transmit their information at a speed of $v$ bits/s., that the telegraph speed through the telephone line is equal to $w$ bits/s., that the cycle time is equal to $Ts$ and that the synchronizing signal occupies a time interval corresponding to $s$ code element places. Then we have $$v=\frac{np}{T}$$

$$w=\frac{anp+m+s}{T}$$

from which it follows by elimination of T $$\frac{w}{v}=\frac{anp+m+s}{np}$$

In this equation $v$, $w$, $m$, $n$ and $s$ are determined by the properties of the system as such and hence may be assumed to be known. The number $a$ of telegrams which can simultaneously be transmitted in time-multiplex through the telephone line is determined by the permissible possibility of service interruption $k$, the mean length of the telegrams, the number $b$ of the sources of information and their mean productivity and can be calculated from these data. The influence of the value of $p$ (=the number of code groups of one telegram which are transmitted per cycle period) on the possibility of service interruption is small as long as $p$ is small compared with the mean number of code groups per telegram and can initially be neglected. $p$ can be calculated with the aid of the above equation and the values of the quantities $v$, $w$, $m$, $n$, $s$ and $a$ found therefrom. The resulting value of $p$ may be considered as a first approximation and be used for calculating a second approximation, which may again be the starting point of a third approximation, and so on.

Figure 2:
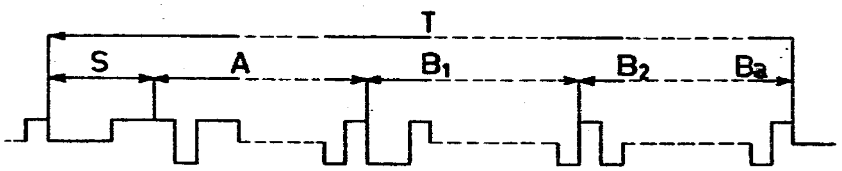
FIG. 2 is an embodiment of the structure of the signal portions transmitted.

FIG. 2 represents an example of the waveform of the signal passing through the telephone line 3. It is assumed that the signal is trivalent:

Zero voltage=rest condition;

Positive voltage=code element having the value 1;

Negative voltage=code element having the value 0.

The cyclically repeated signal portions, one of which is shown diagrammatically in FIG. 2, comprise:

(1) the synchronizing signal comprising a voltage 0 for the duration of three code elements and a positive voltage for the duration of two code elements. In FIG. 2 this portion of the signal is denoted by S.

(2) the address code group having $m$ code element places. In FIG. 2 this portion of the signal is denoted by A.

(3) the $anp$ code elements of the groups which each comprise $p$ code elements of the $a$ telegrams to be transmitted in time-multiplex through the telephone line 3. In FIG. 2 they are firstly the $np$ code elements of the first telegram to be transmitted (signal portion $B_1$), then the $np$ code elements of the second telegram to be transmitted (signal portion $B_2$), and so on.

In the receiving repeater substantially the reverse happens of what takes place in the transmitting repeater 1. The incoming code elements of the address code group are stored in an address memory and the remaining code elements are stored in the receiving memory of the receiving distributor. This further memory is then read and the code elements read out are passed on to the information receivers indicated by the address code group.

Figure 3:
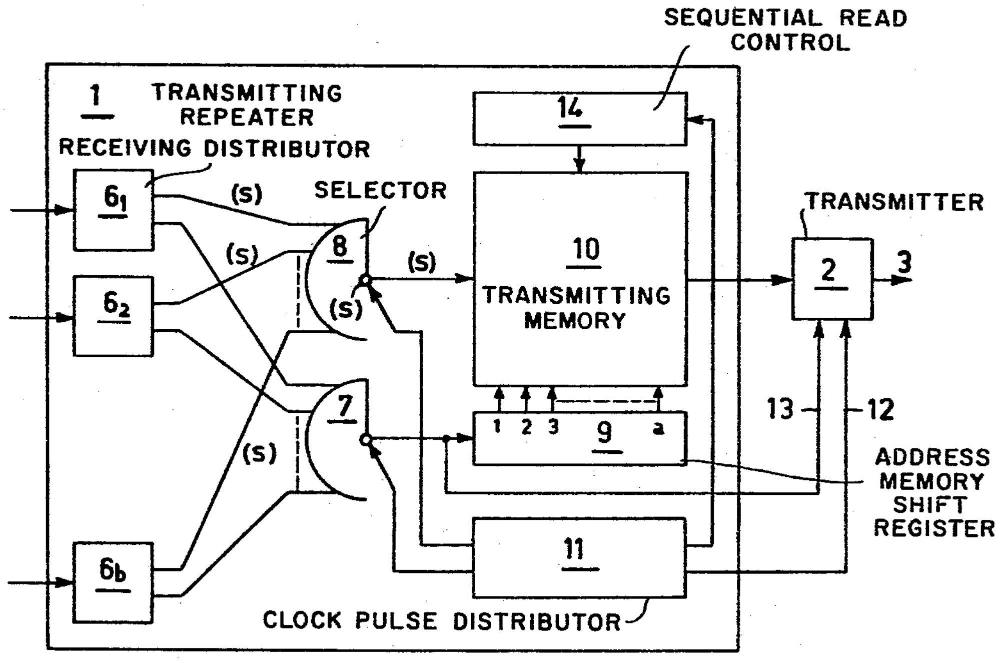
FIG. 3 is a block schematic diagram of a possible embodiment of the transmitting repeater.

FIG. 3 shows a block diagram of a possible embodiment of the transmitting repeater 1. This repeater comprises $b$ receiving distributors $\mathbf{6}_i$ ($i$=1, 2 . . . $b$), two electronic selectors 7 and 8, the latter selector being $s$-fold where $s=np$, which is denoted by ($s$) in FIG. 3, two memories 9 and 10, of which the first acts as an address memory and has the form of a single shift register while the second has $a$ columns each comprising $s=np$ memory elements (for example, annular cores of a material having a rectangular hysteresis loop) and acts as a transmitting memory, and finally a control circuit 11 which, as will be described hereinafter is a clock pulse distributor which delivers pulses to the various elements of the transmitting repeater at the correct instants. Each of the $b$ receiving distributors $6_i$ is connected to an incoming telegraph line and has an output which is connected to a contact of the selector 7 and delivers a bivalent signal which indicates whether or not code elements supplied by the information source concerned are to be transmitted, and further a group of $s=np$ outputs which are connected to corresponding contacts of the $s$-fold selector 8 and deliver signals which indicate the values of the $s$ code elements of a group of $p$ successive code groups of the telegram received through the incoming telegraph line concerned.

Figure 4:
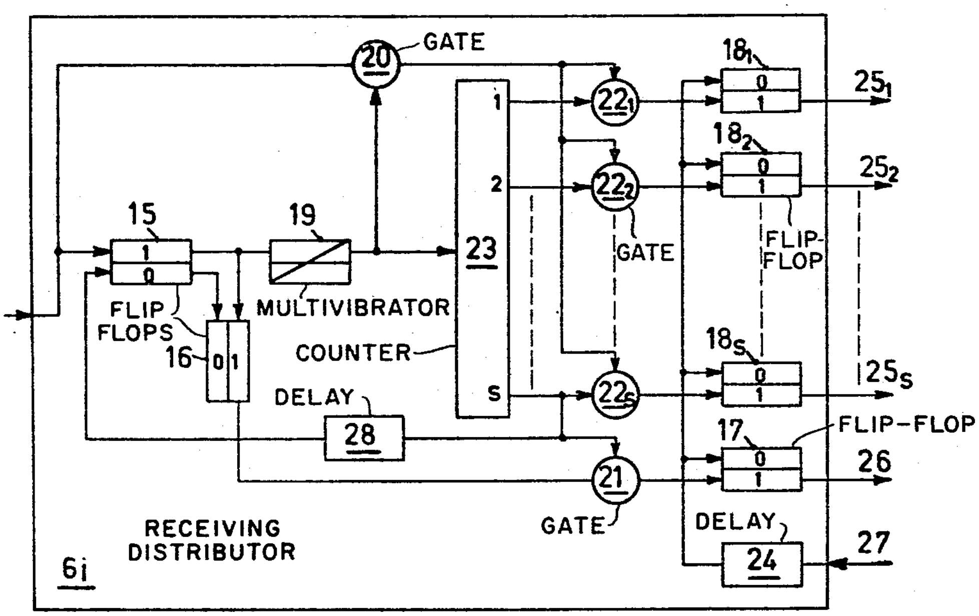
FIGS. 4 and 5 show two embodiments of receiving distributors adapted to be used in the system according to the invention.

FIG. 4 shows an embodiment of a receiving distributor $6_i$. This distributor comprises $s+3$ flip-flops 15, 16, 17, $18_1$, $18_2$ . . . $18_s$, a multivibrator 19, $s+2$ gates 20, 21, $22_1$, $22_2$ . . . $22_s$, a counting circuit 23, two delay elements 24 and 28, a group of $s$ outputs $25_1$, $25_2$ . . . $25_s$, a separate output 26 and a separate input 27. This circuit arrangement operates as follows. When after a rest period (potential 0 at the incoming telegraph line) a start element is received, the flip-flop 15, which initially was in the state 0, changes abruptly to the state 1. As a result the multivibrator 19 is started and the flip-flop 16 takes over the state of the flip-flop 15, that is to say, it changes abruptly to the state 1. The multivibrator 19 periodically opens the gate 20 and at the same time causes the counting circuit 23 to step so that it successively delivers a pulse at each of its $s$ output terminals. The arrangement is designed so that the pulses delivered by the multivibrator fall exactly on the middle portions of the $np$ code elements of the incoming signal. To each of these $np$ code elements correspond an output of the counting circuit 23, a gate $22_k$, a flip-flop $18_k$ and an output $25_k$. When the $k$th code element of the signal portion is a 1, the gate $22_k$ is open at the instant at which this code element occurs and the $k$th output of the counting circuit 23 delivers a pulse which through the gate $22_k$ sets the flip-flop $18_k$, which initially was in the state 0, as will be described hereinafter, to the state 1. When the $k$th code element of the signal portion is a 0, the gate $22_k$ is closed at the instant at which this code element occurs and hence the flip-flop $18_k$ remains in the state 0. Hence, immediately after the instant at which the last, i.e. $s$th code element of the signal portion is received, the flip-flops $18_k$ are in the states which correspond to the corresponding code elements. At the instant at which the $s$th output of the counting circuit 23 delivers a pulse, the gate 21 is opened, so that the flip-flop 17 takes over the state of the flip-flop 16, that is to say changes abruptly to the state 1. Furthermore the flip-flop 15 and hence the flip-flop 16 are reset to the state 0, however, this is effected with a delay sufficient to enable the flip-flop 17 to assume the state previously held by flip-flop 16. This is performed with the aid of a delay element 28, which may be dispensed with due to the flip-over delays of the flip-flops 15 and 16, that is to say, it may be incorporated in these flip-flops. Thus for a certain period of time the group of $s$ outputs $25_k$ delivers the values of the $s$ code elements of the signal portion which has just come in, and the output terminal 26 supplies the information that a signal portion is ready to be transmitted. Hence at the instant at which the receiving distributor $6_i$ is scanned the signals produced by the flip-flops $18_k$ and 17 can be passed on, through the $s$-fold selector 8 and the single selector 7, to the receiving memory 10 and the counting circuit 9 respectively. A pulse then appears also at the input 27 of the receiving distributor $6_i$ and resets the flip-flops $18_k$ and 17 to the state 0. The delay element 24 serves to prevent these flip-flops from returning to the state 0 before they have delivered their output information. This delay member may be dispensed with due to the slowness with which the flip-flops $18_k$ and 17 flip over, in other words it may be incorporated therein. If the code-elements of the incoming telegraph signal have a duration of, for example, 20 msec. (corresponding to a telegraph speed of 50 bits/s), a receiving distributor in which $s$ code elements are stored must be scanned and reset to zero within 20 msec. from the instant at which the last of $s$th code elements is received.

The circuit arrangement shown in FIG. 3 operates as follows. At the beginning of a cycle period of duration T a pulse is applied by the control circuit 11 through the wire 12 to the transmitter 2 so that it transmits the synchronizing signal. Immediately thereupon the selectors 7 and 8 scan all the receiving distributors $6_i$ once. This is effected in less than 20 msec., for example in 15 msec. The signals delivered by the outputs 26 of the receiving distributors $6_i$ form the address code group and hence are passed on through the wire 13 to the transmitter 2 which sequentially transmits this address code group through the telephone line 3. Let it be assumed, for example, that only the receiving distributors $6_2$, $6_5$, $6_7$ and $6_8$ . . . contain and offer information. The counting circuit 9 takes a step and at the same time delivers a pulse at one of its outputs when the selectors 7 and 8 scan the receiving distributors $6_2$, $6_5$, $6_7$, $6_8$ . . . , however, it does not change its condition and hence does not deliver a pulse when these selectors scan the receiving distributors $6_1$, $6_3$, $6_4$, $6_6$, $6_9$ . . . . Thus, for example, at the instant at which the selectors 7 and 8 scan the receiving distributors $6_7$ the third output of the counting circuit 9 delivers a pulse which, in coincidence with the pulses applied through the $s$-fold selector 8 to the memory 10 by the flip-flops $18_k$ of the receiving distributor $6_7$, causes the information present in the receiving distributor $6_7$ to be stored in the third column of the memory 10. Immediately thereupon the code elements stored in the memory 10 are sequentially read in an arbitrary sequence and passed on to the transmitter 2. This transmitter tranmsits these code elements through the telephone line 3. The sequential reading of the memory 10 can be effected, if required in coincidence, by a device 14 which is started by the control circuit 11.

Figure 5:
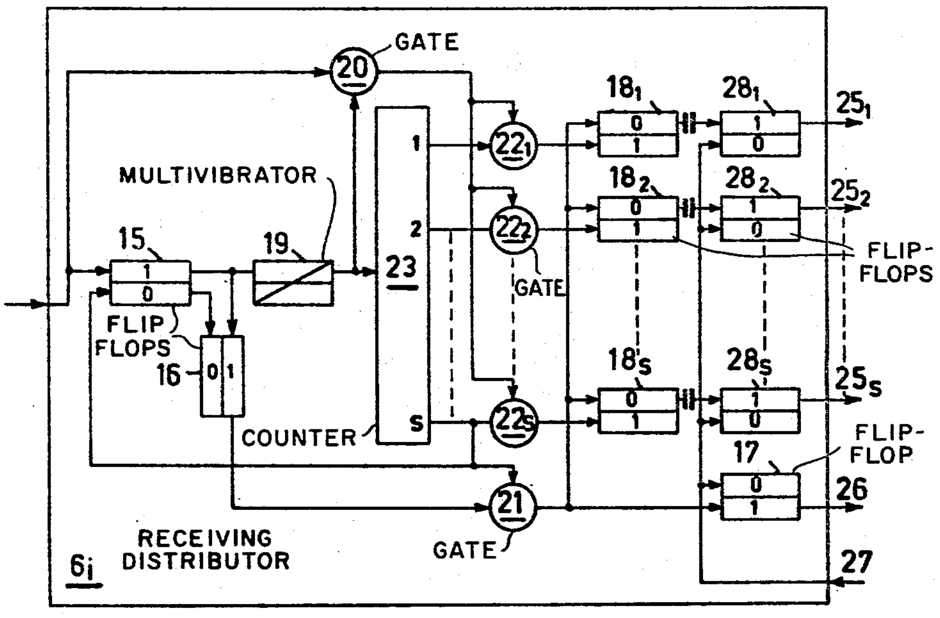

It will be appreciated that this circuit arrangement functions satisfactorily only if the receiving distributors $6_k$ receive their information isochronously, that is to say, in a manner such that they all simultaneously receive a code element which may be the first code element of a group of $p$ successive code groups of a telegram, so that the receiving distributors $6_k$ simultaneously have the information of $p$ successive code groups available for transmission. For this purpose it may be of advantage to synchronize the devices which supply the information to the inputs of the incoming telegraph lines. Otherwise the receiving distributor 1 must be preceded by a device having a memory which produces the necessary isochronization of the incoming telegraph signals and may be of known design. Another possibility is for the devices $6_k$ to be such as to be able to store the code elements to be transmitted for the duration of nearly a cycle period T. For this purpose the devices may be designed as shown in FIG. 5. This circuit arrangement differs from that of FIG. 4 in that it includes a second group of $s$ flip-flops $28_1$, $28_2$ . . . $28_s$, which are capacitively coupled to the flip-flops $18_1$, $18_2$ . . . $18_s$ of the first group of flip-flops. The flip-flops $18_1$, $18_s$ . . . $18_2$ are reset to the zero state by the voltage passed by the gate 21 in its open condition. The flip-flops $28_1$, $28_2$ . . . $28_s$ are reset to the zero state by the pulse applied to the input 27. In the figure no delay elements are shown, in other words it is assumed that the required delays are incorporated in the flip-flops themselves.

The circuit arrangement operates as follows. When the last or $s$th output of the counting circuit 23 delivers a pulse, the gate 21 is opened and the voltage produced by the flip-flop 16, which is in the state 1, is transmitted to the flip-flop 17 and the flip-flops $18_1$, $18_2$ . . . $18_s$. As a result the flip-flop 17 changes to the state 1 and the flip-flops $18_k$ which are in the state 1 are reset to the state 0.

However, a flip-flop $18_k$ when reset from the state 1 to the state 0 sets the corresponding flip-flop $28_k$ to the state 1 due to the capacitive coupling. Hence, the flip-flops $28_1, 28_2 \ldots 28_s$ now have assumed the states of the flip-flops $18_1, 18_2 \ldots 18_s$ and can remain in these states nearly up to the instant at which the last or $s$th output of the counting circuit 23 again delivers a pulse, that is to say for the duration of nearly an entire cycle period T. Thus the devices supplying the information to the incoming telegraph lines need not be isochronized.

The telegraph signal transmitted through the telephone line 3 is applied to the receiver 4, which converts it into a form more suitable for further handling. The receiver 4 includes a detector for the synchronizing signal. The receiver 4 and the synchronizing detector may be of known design.

Figure 6:
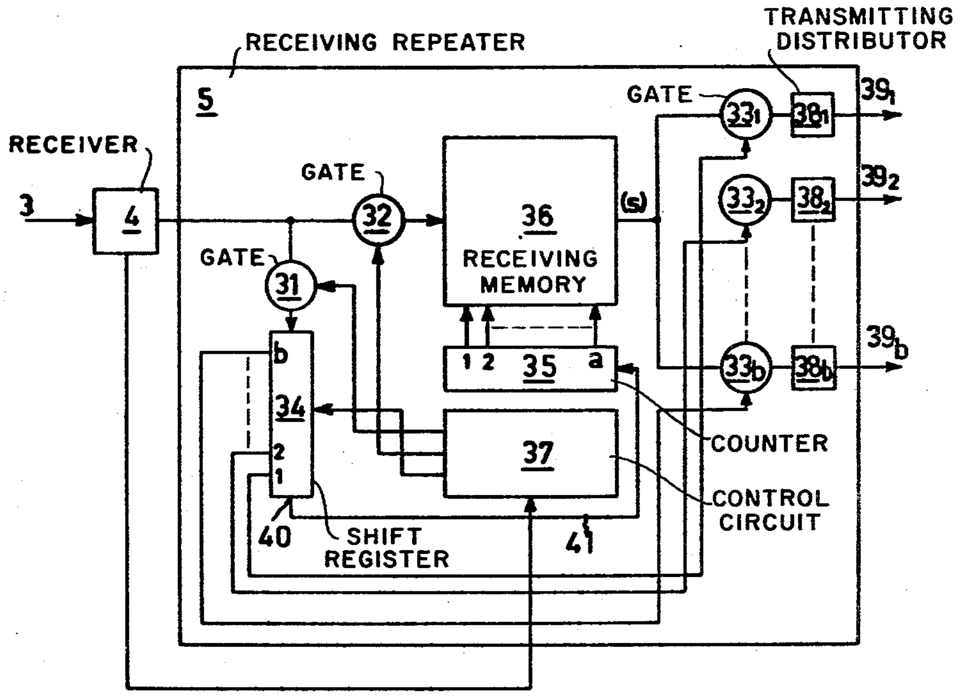
FIG. 6 shows an embodiment of the receiving repeater.

FIG. 6 shows a possible embodiment of the receiving repeater 5. This repeater comprises $b+2$ gates, namely the two single gates 31 and 32 and the $bs$-fold gates $33_1, 33_2 \ldots 33_b$, a shift register 34, a counting circuit 35, a receiving memory 36 having $a$ columns, a control circuit 37, $b$ transmitting distributors $38_1, 38_2 \ldots 38_b$ and $b$ outputs $39_1, 39_2 \ldots 39_b$. The control circuit 37 is essentially a clock pulse distributor which, once started, ensures that suitable control pulses are applied to all the members of the transmitting repeater at the correct instants.

This circuit arrangement operates as follows. When the receiver 4 has detected a synchronizing signal and applied it to the control circuit 37, the gate 31 is opened $b$ times and then the gate 32 is opened $anp$ times. As a result the $b$ code elements of the address code group are stored in the shift register 34 and subsequently the remaining $anp$ code elements are stored in the receiving memory 36. The first code element of the address code group is then read from the shift register 34. This register is designed so that each time when a mode element 1 is read a pulse appears at the relevant output of the shift register and opens the $s$-fold gate $33_k$ corresponding to the code element read out, while simultaneously an output 40 delivers a pulse which is applied to the counting circuit 35 through a wire 41. As a result the counting circuit takes a step and delivers a pulse at one of its outputs. However, when a code element 0 is read, the shift register delivers no pulses.

Hereinbefore it has been assumed that the address code group is equal to 01001011 . . . . At the instants at which the second, fifth, seventh, eighth . . . code element of the address group are read, the shift register 34 each time delivers two pulses simultaneously, while at the instants at which the first, third, fourth, sixth . . . code element of the address code group are read no pulses are delivered by the shift register. Immediately before the seventh code element of the address code group is read, the counting circuit 35 thus has already received two pulses through the wire 41 so that it is ready at its third output. Consequently, at the instants at which the seventh code element of the address code group is read, the third output of the counting circuit 35 delivers a pulse and the $s$-fold gate $33_7$ is opened. As a result the $np$ code elements received from the seventh source of information are read from the third column of the receiving memory 36 and transmitted through the open $s$-fold gate $33_7$ in parallel to the transmitting distributor $38_7$. This transmitting divider sequentially transmits the said parallel received code elements at the correct telegraph speed.

What is claimed is:

1. A time-division multiplex telegraph transmission system comprising a transmitter, a receiver, a transmission channel interconnecting said transmitter and receiver, $b$ sources of sequential telegraph signals, wherein $b$ is a predetermined number, and a transmitting repeater connected to apply said telegraph signals to said transmitter, said transmitting repeater comprising a separate receiving distributor for each said source, each receiving distributor having an input connected to the respective source, each receiving distributor further comprising a set of $s$ signal outputs, wherein $s$ is a predetermined number and means for converting the received sequential signals to parallel signals at said outputs, each said receiving distributor further comprising an additional output, and means for applying a bivalent signal to the respective said additional output responsive to the completion of a conversion of sequential signals to said signal outputs, said transmitting repeater further comprising a transmitting memory having $a$ memory compartments, wherein $a$ is the maximum number of telegraphic signals that can be simultaneously transmitted in time-multiplex through said channel, and $a$ is less than $b$, said transmitting memory having a control terminal corresponding to each said compartment whereby signals applied to said transmitting memory are stored in a compartment upon the simultaneous energization of the corresponding control terminal, said transmitting repeater further comprising a counting circuit having an input terminal and a plurality of output terminals, each of said output terminals being connected to a separate control terminal, single selector means connected to sequentially connect said additional outputs to said transmitter and to said input terminal of said counting circuit, a set of $s$ additional selector means for sequentially connecting the signal outputs of said receiving distributors to said transmitting memory, each signal output of each receiving distributor being connected to a separate additional selector, whereby all of the $s$-outputs of a given receiving distributor are connected to said transmitting memory at the time the corresponding said additional output is connected to said input terminal of said counting means, clock pulse distributor means, means connecting said clock pulse distributor means to said transmitter for applying synchronizing signals to said channel, means for connecting said clock pulse distributor to said single and $s$ additional selector means whereby said single and additional selector means are operated in a cyclic sequence, means for connecting said transmitting memory to said transmitter, and means for connecting said clock pulse distributor to said transmitting memory, whereby the contents of said compartments are sequentially applied in a predetermined order to said transmitter.

2. The transmission system of claim 1, comprising a receiving repeater connected to said receiver, said receiving repeater comprising a shift register having an input, a set of $b$ outputs, and a shift register control terminal, said shift register further having an additional output, whereby signals stored in said shift register are sequentially applied to said $b$ outputs and a pulse appears at said last mentioned additional output whenever a $b$ output delivers a pulse in response to the application of a series of $b$ pulses to said shift register control terminal, a receiving memory having an input, a set of $s$ outputs, $a$ memory compartments, and a receiving memory control terminal for each compartment, whereby each compartment of said receiving memory is read out in parallel to the set of $s$ outputs thereof in response to the application of a pulse to the respective receiving memory control terminal, a counting circuit having a separate output connected to each receiving memory control terminal, and a counting circuit control terminal connected to said additional output of said shift register, $b$ transmitting distributors, $bs$-fold gates for connecting the $s$ outputs of said receiving memory to separate transmitting distributors, each said $s$-fold gate having a gate control terminal connected to a separate $b$ output of said shift register, a shift register gate connecting said receiver to the input of said shift register, a receiving memory gate connecting said receiver to the input of said receiving memory, clock pulse distributor means responsive to the reception of a synchronizing signal by said receiver to start a clock cycle, said clock distributor being connected to said shift register gate, receiving memory gate, and said shift register control terminal for first releasing said shift register gate for *b* clock periods, then releasing said receiving memory gate for a plurality of clock periods, and then applying said *b* pulses to the control terminal of said shift register, and output circuit means connected to said transmitting distributors.

References Cited

UNITED STATES PATENTS

| | | | |
|---|---|---|---|
| 2,744,960 | 5/1956 | Greefkes | 178—50 |
| 3,046,348 | 7/1962 | Osborn | 179—15 |
| 3,153,122 | 10/1964 | Faulkner | 179—15 |

NEIL C. READ, *Primary Examiner.*

DAVID G. REDINBAUGH, *Examiner.*

S. J. GLASSMAN, T. A. ROBINSON, *Assistant Examiners.*

UNITED STATES PATENT OFFICE

CERTIFICATE OF CORRECTION

Patent No. 3,333,051 July 25, 1967

Franz Josef Schramel

It is hereby certified that error appears in the above numbered patent requiring correction and that the said Letters Patent should read as corrected below.

Column 2, line 26, after "denotes" insert -- a transmitting --; column 3, line 44, for "element" read -- elements --; column 5, line 8, before "corresponding" insert -- s --, in italics; column 7, line 37, for "mode" read -- code --.

Signed and sealed this 18th day of March 1969.

(SEAL)

Attest:

Edward M. Fletcher, Jr.
Attesting Officer

EDWARD J. BRENNER
Commissioner of Patents